United States Patent [19]

Benton

[11] 3,998,683
[45] Dec. 21, 1976

[54] METHOD OF MAKING INSULATING BOARD

[76] Inventor: James W. Benton, 48871 Denton Road, Belleville, Mich. 48111

[22] Filed: May 19, 1975

[21] Appl. No.: 578,674

Related U.S. Application Data

[63] Continuation of Ser. No. 420,604, Nov. 30, 1973, abandoned.

[52] U.S. Cl. .............................. 156/164; 156/306; 156/322; 156/324; 156/555
[51] Int. Cl.² .................................... B32B 31/08
[58] Field of Search ............ 156/78, 309, 320, 321, 156/322, 324, 555, 160, 163, 164, 229, 244, 306, 582; 428/310, 311, 314, 511

[56] References Cited

UNITED STATES PATENTS 3,062,698   11/1962   Aykanian ....................... 156/306
3,823,047   7/1974    Colombo ....................... 156/322

Primary Examiner—David A. Simmons

[57] ABSTRACT

A method of making laminated insulated board comprising continuously removing fibrous sheets from supply rolls and subjecting the fibrous sheets to heat sufficient to raise the temperature of the sheets above the melting point of the foamed thermoplastic sheet to which the fibrous sheets are to be applied. A thermoplastic sheet is continuously removed from a roll and heated. The heated fibrous sheets are applied to the surfaces of the foamed thermoplastic sheet to form continuously moving assembly, and pressure is applied to said assembly sufficient to reduce the cross section of the assembly. Additional pressure is applied to the assembly at a point spaced longitudinally downstream from said first pressure area, and the portion of the assembly between the two pressure areas is subjected to longitudinal tension and the assembly is thereafter permitted to cool.

3 Claims, 2 Drawing Figures

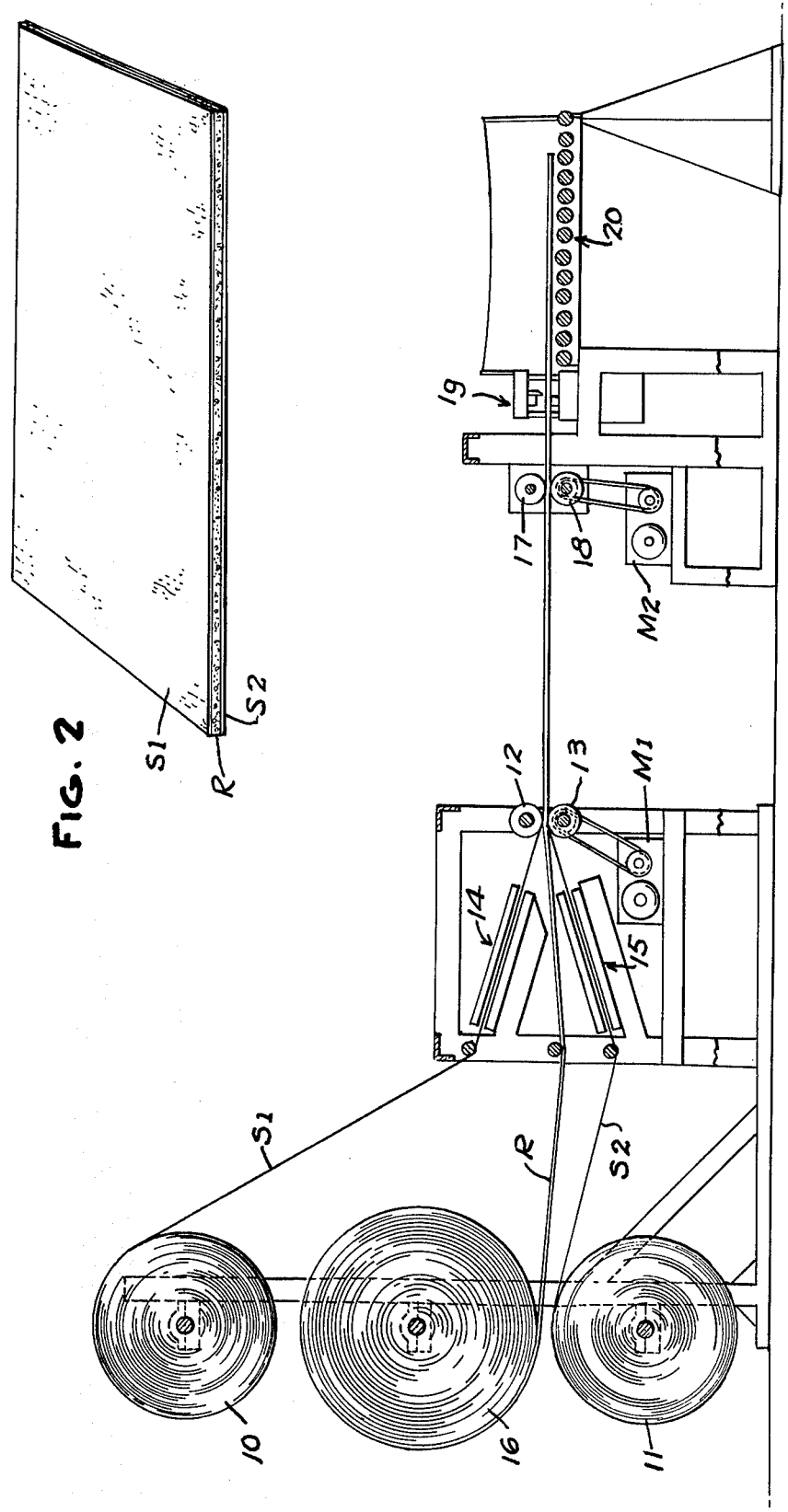

METHOD OF MAKING INSULATING BOARD

This is a continuation of application Ser. No. 420,604, filed Nov. 30, 1973, now abandoned.

This invention relates to making insulating board.

BACKGROUND OF THE INVENTION

It has heretofore been proposed that an insulating board may be made by applying fibrous sheet to a block of foamed thermoplastic material by applying heat to the fibrous sheet and thereafter assembling the sheet to the block of resin material and continuing the application of heat with pressure for a short period of time. One of the problems with such a method is that the foam must be in a rigid form which makes the method difficult to practice in thin insulating boards since the foam material tends to be quite rigid so that when the thin material is rolled for storage, it has a configuration which makes it difficult to handle and thereby tends to crack or break as it is removed from the rolls.

Accordingly, among the objects of the invention are to provide a method for making thin insulating board and particularly to make such board from foamed thermoplastic sheet material that has been provided in a roll that is at ambient temperature.

SUMMARY OF THE INVENTION

In accordance with the invention, flexible fibrous sheets are heated to a temperature above the melting point of a foamed thermoplastic resin sheet and applied to the surfaces of said thermoplastic resin sheet which is removed from a supply roll and heated. Thereafter, the assembly of fibrous sheets and foamed thermoplastic resin sheet is subjected to pressure sufficient to reduce the cross section of the assembly. This assembly is then subjected to tension in the direction of the plane of the sheets. Finally, the assembly is permitted to cool.

More specifically, the method of making laminated insulated board comprises continuously removing fibrous sheets from rolls and subjecting the fibrous sheets to heat sufficient to raise the temperature of the sheet above the melting point of the foamed thermoplastic sheet to which the fibrous sheets are to be applied. A foamed thermoplastic sheet is continuously removed from a supply roll and moved between the heated fibrous sheets. The heated fibrous sheets are applied to the surfaces of the foamed thermoplastic sheet to form an assembly. Pressure to said assembly at spaced longitudinal points by pressure rolls moving at different speeds so that the assembly is subjected to longitudinal tension. Finally, the assembly is severed into predetermined lengths which are permitted to cool.

DESCRIPTION OF THE DRAWINGS

FIG. 1 is a partly diagrammatic view showing the apparatus for performing the method.

FIG. 2 is a perspective view of an insulating board made in accordance with the invention.

DESCRIPTION

Basically, in accordance with the invention, fibrous sheets S1, S2 are continuously removed from supply rolls 10, 11 by the action of pressure rolls 12, 13, and moved through a heating zone 14, 15 where the fibrous sheet material is elevated to a temperature slightly greater than the melting temperature of the foamed thermoplastic resin material to which it is to be adhered. Rolls 12, 13 are rotated by a motor M1. Simultaneously, the rolls 12, 13 continuously withdraw a foamed thermoplastic sheet R from a supply roll 16 and move the material between the two heat sources 14, 15 so that it is softened and then drawn by the rolls 12, 13 between the fibrous sheets S1, S2. The rolls 12, 13 compress the assembly of the sheets S1 and S2 and the resin sheet R to a cross section less than the original cross section. The continuous assembly of the sheets is then passed between pressure rollers 17, 18 that are rotated by a motor M2 at a speed slightly greater than the speed of the rollers 12, 13 so that the portion of the continuous assembled sheets between the two sets of rolls 12, 13 and 17, 18 is subjected to tension. The continuous assembly then passes beneath a cutter 19 that is operated periodically to cut off predetermined lengths and deliver then to an endless conveyor 20 for removal. The lengths are then permitted to cool.

The heating zones 14, 15 can utilize any suitable heating device such as quartz heaters.

It has been found that, in practice, the resultant board after cooling is substantially rigid and has a greater strength than the original foamed thermoplastic resin sheet R. Moreover, the tensioning applied between the two sets of rollers 12, 13 and 17, 18 contributes to production of an even more rigid product.

EXAMPLE

In a typical example, the fibrous sheets S1, S2 comprise kraft paper having a thickness of 0.020 inch and the foamed thermoplastic sheet material comprise polystyrene having a thickness of 0.100 inch. The heaters at zone 14, 15 elevate the temperature of the fibrous sheets to 340° F. at the point where the sheets S1, S2 enter the rolls 12, 13 which are spaced apart 0.125 inch. The rolls 12, 13 were rotated at 20 feet per minute and the rolls 17, 18 at 20.2 feet per minute.

In testing, it was found that sections cut out at the rolls 17, 18 were still soft and thermoplastic.

It was found that the resultant board after cooling was extremely rigid, flat without paper wrinkles, uniform, and strong. In my opinion, these properties are due in great part to the tension to which the two external sheets and dissimilar substrate or inner layers are subjected in production.

Although in the example given certain roll speeds have been designated, higher speeds may be used depending on the amount of heat available for heating the paper, the greater the amount of heat available the greater the speed of operation which can be used.

Although the invention has been described in connection with kraft paper, other fibrous sheets such as textile materials may be used. Similarly, although the invention has been described in connection with foamed polystyrene, other foam plastic materials which are well known may be used such as foams derived from cellulose ethers and esters, e.g., ethyl cellulose, cellulose acetate, cellulose nitrate; homopolymers and interpolymers of monomers containing the vinylidene groups $CH_2 = C<$ such as vinyl halides, e.g., vinyl chlorise, vinyl bromide; vinylidene chloride; vinyl esters of carboxylic acids, e.g., vinyl acetate, vinyl propionate, vinyl benzoate; olefins, e.g., ethylene, isobutylene; vinyl ethers, e.g., vinyl methyl ether, vinyl ethyl ether, vinyl isobutyl ether; unsaturated carboxylic acids and derivatives thereof, e.g., acrylic acid, methacrylic acid, emthyl acrylate, ethyl carylate, methyl methacrylate, acrylamide, acrylonitrile, methacrylonitrile; and interpolymers of the above type, vinylidene monomers and unsaturated alpha,beta-polycarboxylic acids and derivatives thereof, e.g. maleic anhydride, dimethyl maleate, dibutyl fumarate, diallyl maleate, etc. In general, optimum results are obtained with rigid, relatively non-elastic thermoplastic resins such as homopolymers and interpolymers of vinyl chloride, homopolymers of vinyl aromatic compounds, e.g., styrene, o-chlorostyrene, p-chlorostyrene, 2,5-dichlorostyrene, 2,4-dichlorostyrene, p-methylstyrene, p-ethylstyrene, vinyl naphthalene, alpha-methylstyrene and interpolymers of such vinyl aromatic compounds containing at least 70% of the vinyl aromatic compound. It is feasible and sometimes desirable to employ a blend of two or more thermoplastic resins such as, e.g. a blend of styrene and a rubbery diene polymer such as natural rubber, butadiene-styrene rubbers, butadientacrylonitrile rubbers and the like. High impact polystyrene prepared by polymerizing monomeric styrene in the presence of a rubbery diene polymer also may be employed advantageously.

I claim:

1. The method of making laminated insulated board which comprises
    continuously removing fibrous sheets from rolls,
    continuously moving said fibrous sheets through heat zones sufficient to raise the temperature of the sheet above the melting point of the foamed thermoplastic sheet to which the fibrous sheets are to be applied,
    continuously removing a foamed thermoplastic sheet from a roll at ambient temperature,
    continuously moving said foamed thermoplastic sheet between said heated fibrous sheets,
    applying said heated fibrous sheets to the surface of the foamed thermoplastic sheet to form an assembly,
    continuously moving said assembly through a first set of rolls to apply pressure to said assembly sufficient to reduce the cross section of the assembly,
    continuously moving said assembly directly from said first set of rolls through a second set of rolls at a point spaced longitudinally downstream from said first set of rolls,
    rotating said second set of rolls at a speed greater than said first set of rolls to subject said assembly to longitudinal tension,
    controlling the temperature and speed such that said assembly being soft and thermoplastic as it leaves said second set of rolls,
    and thereafter permitting said assembly to cool.

2. The method set forth in claim 1 which the fibrous sheet comprises paper and the foamed thermoplastic resin sheet comprises polystyrene.

3. The method set forth in claim 1 wherein said paper sheet is heated to approximately 340° F. prior to assembly with said foamed thermoplastic resin sheet.

* * * * *